(12) United States Patent
Liu

(10) Patent No.: US 6,909,675 B2
(45) Date of Patent: Jun. 21, 2005

(54) METHOD FOR SWITCHING AN OPTICAL DISC APPARATUS TO DIFFERENT ACCESSING SPEEDS

(75) Inventor: Jen-Cheng Liu, Chiai (TW)

(73) Assignee: Lite-On It Corporation, Taipei (TW)

( * ) Notice: Subject to any disclaimer, the term of this patent is extended or adjusted under 35 U.S.C. 154(b) by 354 days.

(21) Appl. No.: 10/352,479

(22) Filed: Jan. 28, 2003

(65) Prior Publication Data

US 2004/0027932 A1 Feb. 12, 2004

(30) Foreign Application Priority Data

Aug. 6, 2002 (TW) .......................................... 91117718 A

(51) Int. Cl.⁷ .............................................. G11B 21/08
(52) U.S. Cl. .................. 369/30.15; 369/53.37
(58) Field of Search ............................ 369/30.1, 30.15, 369/30.17, 30.32, 47.38, 47.39, 47.55, 53.3, 53.37, 53.43, 53.45; 360/72.1, 73.01, 73.03

(56) References Cited

U.S. PATENT DOCUMENTS

| | | | | |
|---|---|---|---|---|
| 4,321,635 A | * | 3/1982 | Tsuyuguchi | ................ 360/72.2 |
| 5,604,722 A | * | 2/1997 | Suzuki | .................... 369/44.28 |
| 5,612,933 A | * | 3/1997 | Iso et al. | ................. 369/44.27 |
| 5,822,281 A | * | 10/1998 | Yumita | .................... 369/13.32 |
| 6,118,743 A | * | 9/2000 | Kumita | .................... 369/47.44 |

* cited by examiner

Primary Examiner—Paul W. Huber
(74) Attorney, Agent, or Firm—Thomas, Kayden, Horstemeyer & Risley

(57) ABSTRACT

A method for switching an optical disc apparatus to different accessing speeds. The optical disc apparatus has a control button with which to eject a disc. The method comprises the steps of operating the optical disc apparatus in a first mode, switching the optical disc apparatus from the first to a second mode when the control button is pressed for a duration exceeding a predetermined period of time, and switching the optical disc apparatus to the first mode and ejecting the disc when the optical disc apparatus operates in the second mode and the control button is pressed.

16 Claims, 2 Drawing Sheets

| Mode / (X, Y) | 00 | 01 | 10 | 11 |
|---|---|---|---|---|
| First mode | Staying in first mode | × | Disc ejection | Switching to second mode |
| Second mode | Staying in second mode | × | Switching to first mode and disc ejection | Switching to first mode and disc ejection |

FIG. 2

METHOD FOR SWITCHING AN OPTICAL DISC APPARATUS TO DIFFERENT ACCESSING SPEEDS

BACKGROUND OF THE INVENTION

1. Field of the Invention

The present invention relates to a method for switching an optical disc apparatus to different accessing speeds and particularly to a method of switching the accessing speed by pressing a control button on the apparatus.

2. Description of the Prior Art

In development of the optical disc apparatus, the read and write speeds (accessing speeds) are the most critical aspects of performance the designers endeavor to improve. Optical disc apparatus manufacturers must consistently address the challenges associated with high read and write speeds. As an example, the rotation speed of the spindle motor in a commercially available 48× optical disc apparatus can be 9600 rpm. Compared to an optical disc apparatus with a low speed, it is much more difficult to eliminate the vibration and noise induced by the motor at such a high rotation speed. Further, such a high rotation speed may damage some discs of inferior quality.

The tradeoff among speed and noise and disc damages is thus difficult for manufacturers. When a disc is put into the optical disc apparatus, the optical disc apparatus firstly identifies the disc type and provides an appropriate accessing speed to the disk according to disc runout, unbalance and size. Consumers will have less desire for a optical disc apparatus which always operates at a low speed due to poor disc quality and cannot be switched to the maximum speed.

SUMMARY OF THE INVENTION

The object of the present invention is to provide a method for switching an optical disc apparatus to different accessing speeds by only pressing the control button on the optical disc apparatus exceeding a predetermined period of time period, which eliminates the need for software control of the accessing speed.

The present invention provides a method for switching an optical disc apparatus to different accessing speeds, wherein the optical disc apparatus has a control button with which to eject a disc, comprising operating the optical disc apparatus in a first mode, switching the optical disc apparatus from the first to a second mode when the control button is pressed for a duration exceeding a predetermined period of time, and switching the optical disc apparatus to the first mode and ejecting the CD when the optical disc apparatus operates in the second mode and the control button is pressed.

The present invention also provides a method for switching a optical disc apparatus to different accessing speeds, wherein the optical disc apparatus has a control button with which to eject a disc, consisting of operating the optical disc apparatus in a first mode, switching the optical disc apparatus from the first to a second mode when the control button is pressed for a duration exceeding a predetermined period of time, and switching the optical disc apparatus to the first mode and ejecting the disc when the optical disc apparatus operates in the second mode and the control button is pressed, wherein the optical disc apparatus operates in the first mode by default, has a first accessing speed when operating in the first mode, and has a second accessing speed when operating in the second mode.

BRIEF DESCRIPTION OF THE DRAWINGS

The present invention will become more fully understood from the detailed description given hereinbelow and the accompanying drawings, given by way of illustration only and thus not intended to be limitative of the present invention.

FIG. 2 is a diagram showing the operating modes of the optical disc apparatus according to one embodiment of the invention.

DETAILED DESCRIPTION OF THE INVENTION

Figure 1:
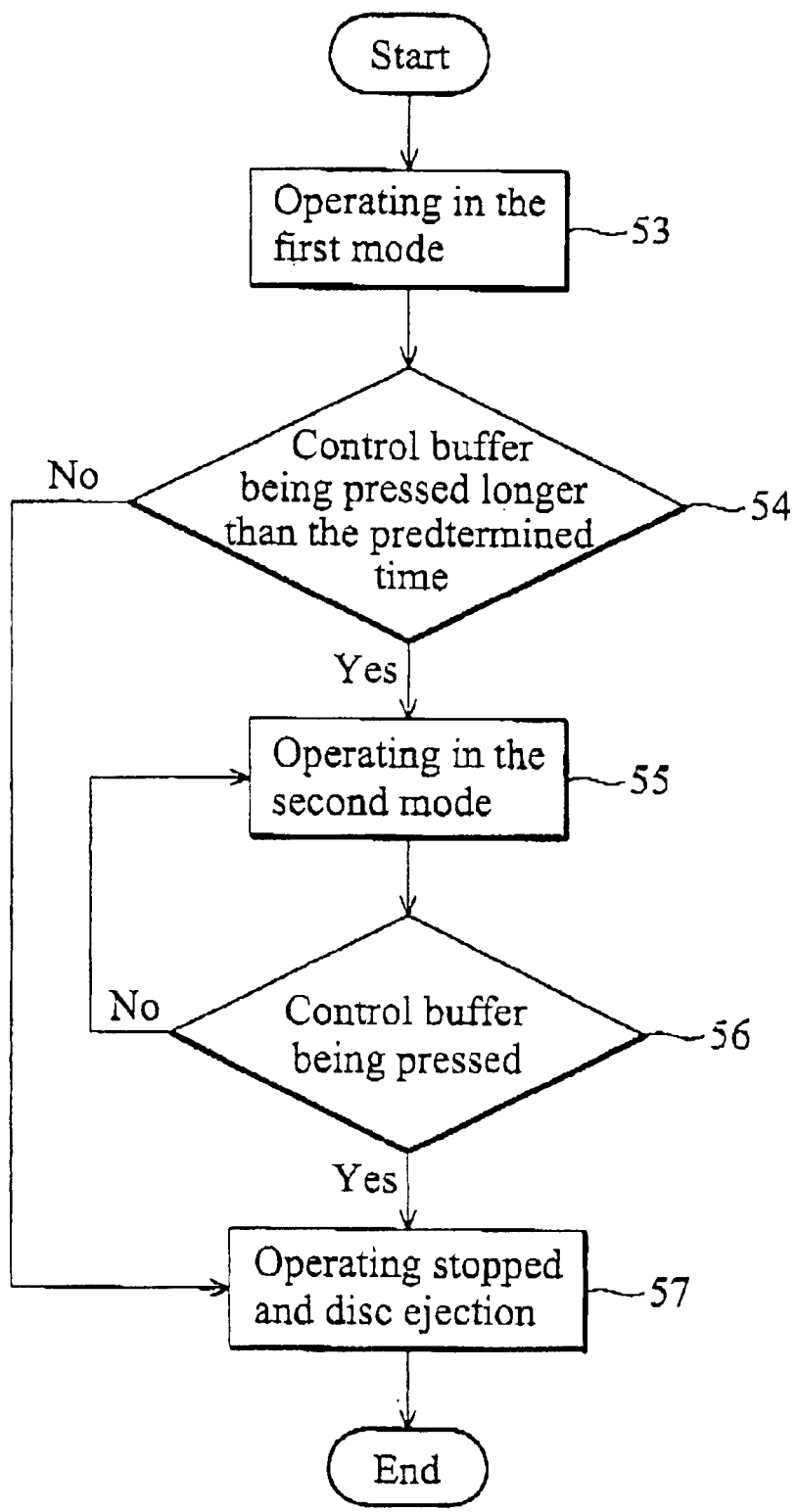
FIG. 1 is a flowchart of a method for switching an optical disc apparatus to different accessing speeds according to one embodiment of the invention.

FIG. 1 is a flowchart of a method for switching an optical disc apparatus to different accessing speeds according to one embodiment of the invention.

In step 53, after the optical disc apparatus is reset or initialized, it operates in a first mode by default. That is to say, the optical disc apparatus initially operates at a first accessing speed to read data from the source disc or write data to the disc.

In step 54, when the disc is compatible with a speed higher than the accessing speed, the optical disc apparatus switches from the first accessing speed to a second accessing speed by pressing the control button exceeding a predetermined period of time, such as pressing an eject button exceeding five seconds. If the control button is pressed for a duration exceeding the predetermined period of time, the step 55 is implemented; otherwise, the step 57 is implemented.

In step 55, the optical disc apparatus operates in the second mode. That is to say, the optical disc apparatus is switched to operate at a second accessing speed which is higher than the first accessing speed to read data from the source disc or write data to the disc.

In step 56, when the optical disc apparatus operates in the second mode and the control button is pressed (irrespective of the length of time it is pressed), step 57 is implemented; otherwise, the optical disc apparatus continues to operate at the second accessing speed.

In step 57, the optical disc apparatus stops and the disc is ejected from the optical disc apparatus.

In the previously described embodiment, speed switching by pressing the control button is made possible by only coding the firmware in the controller chip and using a timer to calculate the time pressed. The timer calculates the time pressed of the control button and is reset after the optical disc apparatus switches from the first to second mode due to the time pressed exceeding the predetermined period of time or after the optical disc apparatus stops and ejects the disc. The timer starts to calculate the time as long as the control button is pressed, and stops calculating and is reset when the optical disc apparatus takes action.

According to the embodiment, when the control button is pressed exceeding the predetermined period of time in the first mode, switch the optical disc apparatus to the second mode and reset the timer, when the control button is pressed shorter than the predetermined period of time in the first mode, stop the operating of the optical disc apparatus and eject the disc and reset the timer, when the control button is pressed in the second mode, stop the operating of the optical disc apparatus and eject the disc and reset the timer.

FIG. 2 is a diagram showing the operating modes of the optical disc apparatus according to one embodiment of the invention. As previously described, the optical disc apparatus may operate in two modes wherein the disc is operated at the first and second accessing speed respectively. In FIG. 2, (x,y) indicates status of the control button, wherein x indicates whether the button is pressed and y indicates whether the time pressed exceeds the predetermined period of time. Accordingly, (0,0) indicates that the control button is not pressed. At the first and second modes, (1,0) indicates that the time pressed is shorter than the predetermined period of time, and the optical disc apparatus stops the operating of the optical disc apparatus, and then ejects the disc. At the first mode, (1,1) indicates that the time pressed exceeds the predetermined period of time, and the optical disc apparatus switches to the second mode. At the second modes, (1,1) indicates that the time pressed is exceeding the predetermined period of time, and the optical disc apparatus stops the operating of the optical disc apparatus, and then ejects the disc. There is no indication (0,1). It is noted that the optical disc apparatus stops and ejects the disc irrespective of its current operation mode when the status of the control button is (1,0). It is also noted that when the status of the control button is (1,1), the optical disc apparatus operating in the first mode will switch to the second mode and the optical disc apparatus already operating in the second mode will switch to the first mode and eject the disc.

In conclusion, in the present invention, speed switching by pressing the control button is made possible by only coding the firmware in the controller chip and using a timer to calculate the time pressed. This eliminates the need for software control of accessing speeds, such that discs are read or written to at a high speed without undue noise or risk of damage.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for switching an optical disc apparatus to different accessing speeds, wherein the optical disc apparatus has a control button, the method comprising:
    operating the optical disc apparatus in a first mode;
    switching the optical disc apparatus from the first to a second mode when the control button is pressed for a duration exceeding a predetermined period of time; and
    switching the optical disc apparatus to the first mode and ejecting a disc when the optical disc apparatus operates in the second mode and the control button is pressed;
    wherein a accessing speed in the first mode is higher than a accessing speed in the second mode.

2. The method as claimed in claim 1, wherein the predetermined period of time is 5 seconds.

3. The method as claimed in claim 1, wherein the control button is an eject button on the optical disc apparatus.

4. The method as claimed in claim 3, wherein the accessing speed in the second mode is a maximum speed at which the optical disc apparatus can access the disc.

5. The method as claimed in claim 1 further comprising the step of operating the optical disc apparatus in the first mode when the optical disc apparatus is reset.

6. The method as claimed in claim 1, wherein the optical disc apparatus in the first mode stops accessing the disc, and ejects the disc when the duration is shorter than the predetermined period of time.

7. The method as claimed in claim 1, wherein the optical disc apparatus operates in the first mode by default.

8. The method as claimed in claim 1 further comprising:
    timing the duration by using a timer when the control button is pressed;
    switching the optical disc apparatus to the second mode and resetting the timer when the optical disc apparatus operates in the first mode and the duration exceeding the predetermined period of time;
    switching the optical disc apparatus to the first mode, stopping the operation of the optical disc apparatus, ejecting the CD and resetting the timer when the optical disc apparatus operates in the second mode and the control button is pressed; and
    stopping the operating of the optical disc apparatus, ejecting the CD and resetting the timer when the optical disc apparatus operates in the first mode and the duration is shorter than the predetermined period of time.

9. A method for switching an optical disc apparatus to different accessing speeds, wherein the optical disc apparatus has a control button, the method comprising:
    operating the optical disc apparatus in a first mode;
    switching the optical disc apparatus from the first mode to a second mode when the control button is pressed for a duration exceeding a predetermined period of time; and
    switching the optical disc apparatus to the first mode and ejecting the a disc when the optical disc apparatus operates in the second mode and the control button is pressed;
    wherein the optical disc apparatus operates in the first mode by default, has a first accessing speed when operating in the first mode, and has a second accessing speed when operating in the second mode.

10. The method as claimed in claim 9, wherein the second accessing speed is higher than the first accessing speed.

11. The method as claimed in claim 9 further comprising operating the optical disc apparatus in the first mode when the optical disc apparatus is reset.

12. The method as claimed in claim 9, wherein the optical disc apparatus in the first mode stops accessing the disc, and ejects the disc when the duration is shorter than the predetermined period of time.

13. The method as claimed in claim 9, wherein the second accessing is a maximum speed at which the optical disc apparatus can access the disc.

14. The method as claimed in claim 9, wherein the predetermined period of time is 5 seconds.

15. The method as claimed in claim 9, wherein the control button is an eject button.

16. The method as claimed in claim 9 further comprising:
    timing the duration by using a timer when the control button is pressed;
    switching the optical disc apparatus to the second mode and resetting the timer when the optical disc apparatus operates in the first mode and the duration exceeding the predetermined period of time;
    switching the optical disc apparatus to the first mode, stopping the operating of the optical disc apparatus, ejecting the CD and resetting the timer when the optical disc apparatus operates in the second mode and the control button is pressed; and stopping the operating of the optical disc apparatus, ejecting the CD and resetting the timer when the optical disc apparatus operates in the first mode and the duration is shorter than the predetermined period of time.

* * * * *